United States Patent [19]

Beck et al.

[11] 4,073,889
[45] Feb. 14, 1978

[54] METHOD FOR PREVENTING AEROBIC DECOMPOSITION PROCESSES IN FERMENTATED FODDER

[75] Inventors: Theodor Beck, Munich; Friedrich Gross, Grub, both of Germany

[73] Assignee: Plate Kofasil Gesellschaft mit beschrankter Haftung, Bonn, Germany

[21] Appl. No.: 659,094

[22] Filed: Feb. 18, 1976

[30] Foreign Application Priority Data

Feb. 19, 1975 Germany .............................. 2507067

[51] Int. Cl.$^2$ ............................................ A01N 13/00
[52] U.S. Cl. .................................... 424/164; 424/317; 426/532
[58] Field of Search ................................ 424/164, 317

[56] References Cited

FOREIGN PATENT DOCUMENTS 2,335,253   1/1975   Germany.

OTHER PUBLICATIONS

Chemical Abstracts, vol. 79, (1973), p. 124909d.
Chemical Abstracts, vol. 56, (1961), p. 740h.

*Primary Examiner*—V. D. Turner
*Attorney, Agent, or Firm*—Donald D. Jeffery

[57] ABSTRACT

A method of preventing aerobic decomposition processes and fermented fodder, and particularly, carbohydrate-containing silages is disclosed. The method involves adding benzoic acid or its salts, metal formates, and alkali salts of sulphurous acid, either individually or in an admixture, to the fodder during storage or to the silage after removal from storage in such a quantity that the fermented fodder contains from about 100 to 1000 ppm of benzoic acid, from 500 to 3000 ppm of metal formate, and from about 75 to 750 ppm of alkali salts of sulphurous acid. The combination of chemicals suppresses secondary aerobic fermentation processes through a synergistic effect.

5 Claims, No Drawings

METHOD FOR PREVENTING AEROBIC DECOMPOSITION PROCESSES IN FERMENTATED FODDER

This invention relates to a method for preventing aerobic decomposition processes in fermented fodder, in which aerobic decomposition processes in fermented fodder are prevented both in the silo and after the fermented fodder has been taken out of storage by an addition of preservatives.

Over recent years, it has frequently been found that undesirable secondary fermentation processes begin in high-quality fermented fodder. Such silage as, in particular, partly withered silage and silage rich in carbohydrates, such as maize and sugar beet leaf silage, becomes heated more or less quickly either inside the fermented silage container itself, even at those places accessible to air, or immediately after the silage has been taken out of storage. This heating process is accompanied by rapid substance degradation, by a reduction in the organic acids formed during the anaerobic fermentation phase and by a protein decomposition process which begins as a result of the increase in pH. Even in the event of only minimal secondary fermentation, fermented fodder of this kind gives rise to digestion difficulties, and if heating has progressed to a temperature of 40° C or higher the fodder is generally refused by the animals. In 1964, Beck and Gross (Das wirtschaftseigene Futter 10, 4) discovered for the first time that a number of special yeasts with an ability to assimilate lactates were responsible for these secondary aerobic fermentation processes in high quality silage. No secondary fermentation occurs in silages of only moderate or poor quality, because even small quantities of butyric acid are sufficient to prevent the development of yeasts.

Of all the conventional silaging aids which prevent butyric acid fermentation, there are only two known possibilities which can also prevent the aerobic decomposition processes, namely:

(a) the addition of propionic acid in a concentration which prevents the development of yeasts (fungistatic effect) and (b) the addition of preservatives with a fungicidal action, for example nitrite and hexamethylene tetramine.

In principle, both processes are equally effective, although their workability in practice is frustated in the case of propionic acid by the high concentration required and the complete lack of economy which this involves and, in the case of the fungicidal preparations used hitherto, by the fact that they are quickly degraded during the fermentation process and thereafter leave the fermented yeast unprotected against secondary infections caused by air leaks in the container.

Any preservative which enables aerobic decomposition processes in high quality silage to be safety prevented, even under practical conditions, has to satisfy the following requirements.

1. complete inhibition of the development of any lactate-assimilating silage yeasts under aerobic conditions;
2. no significant inhibition of the growth of lactic acid bacteria under aerobic conditions;
3. no degradation or inactivation during the aerobic fermentation phase;
4. complete compatibility of silages containing these preservatives from the point of view of nutrition physiology;
5. costs which provide for economic use.

Our microbiological tests on a large number of organic and inorganic compounds have shown that only a very few compounds satisfy the requirements stipulated above.

The object of the present invention is to develop a preserving additive which, by virtue of an appropriate combination of individual substances which, on their own, do not have a satisfactory effect, completely suppresses secondary aerobic fermentation processes through a synergistic effect. The present invention relates to a method of preventing aerobic decomposition processes in fermented fodder, distinguished by the fact that benzoic acid and its salts, formates and alkali salts of sulphurous acid are added individually or in admixture to the fodder during storage or to the silage after removal from storage in such a quantity that the fermented fodder contains from 100 to 1000 ppm of benzoic acid, from 500 to 3000 ppm of formates and from 75 to 750 ppm of salts of sulphurous acid.

The variable active ingredient ratio is determined:
(a) by the concentration which can be used in order not to inhibit lactic acid bacteria,
(b) by the expected reaction of the fermented fodder (pH) on completion of the fermentation phase and
(c) by the intensity of the synergistic effect of the above-mentioned compounds in combination with one another. Table 1 shows the following:
(a) Benzoic acid and its salts, also Ca formate, inhibit the anaerobic fermentation activators (Lactobacilli) to only a limited extent, even in very high concentration ranges (0.1% and 0.2%, respectively). However, sodium disulphite in concentrations of as low as 0.05 to 0.07%, depending upon the reaction of the substrate, retards the growth of lactic acid bacteria to a slight to moderately heavy extent. Heterofermentative lactic acid bacteria (L. buchneri) are more sensitive to disulphite inhibition than homofermentative lactic acid bacteria.
(b) The synergistic effect both between the benzoic acid and its salts and Ca formate and also of these two substances with sodium disulphite is extremely intense.

TABLE 1

Effect of preservatives on the prevention of aerobic decomposition processes in maize silage and on the growth of lactic acid bacteria in liquid culture

| No. | Preservative | mg $O_2$-uptake 20 g maize silage 25° C after 2 days | after 4 days | Growth of lactic acid bacteria (untreated = 100) Lactob. pl. arab. | Lactob buchneri |
|---|---|---|---|---|---|
| 1 | untreated | 420 | >500 | — | — |
| 2 | Na-benzoate 0.025% | 317 | 425 | 100 | 100 |
| 3 | Na-benzoate 0.050% | 122 | 310 | 100 | 100 |
| 4 | Na-benzoate 0.075% | 79 | 278 | 100 | 85 |
| 5 | Na-benzoate 0.100% | 22 | 155 | 85 | 65 |
| 6 | Ca-formate 0.05% | 340 | >500 | 100 | 100 |
| 7 | Ca-formate 0.10% | 228 | 396 | 100 | 100 |
| 8 | Ca-formate 0.20% | 164 | 294 | 95 | 100 |
| 9 | Na-disulphite 0.050% | 7 | 27 | 80 | 65 |
| 10 | Na-disulphite 0.025% | 39 | 104 | 95 | 80 |
| 11 | Na-disulphite 0.010% | 117 | 205 | 100 | 100 |
| | No. 3 + No. 8 | 8 | 17 | 100 | 100 |
| | No. 3 + No. 7 | 23 | 54 | 90 | 85 |
| | No.3 + No. 8 + No. 10 | 4 | 7 | 90 | 80 |

TABLE 1-continued

Effect of preservatives on the prevention of aerobic decomposition processes in maize silage and on the growth of lactic acid bacteria in liquid culture

| No. | Preservative | mg $O_2$-uptake 20 g maize silage 25° C | | Growth of lactic acid bacteria (untreated = 100) | |
|---|---|---|---|---|---|
| | | after 2 days | after 4 days | Lactob. pl. arab. | Lactob buchneri |
| No. 8 + No. 10 | | 12 | 36 | 85 | 90 |

Table 2 shows the very marked dependence upon reaction of the yeast-inhibiting effect of these three preservatives.

TABLE 2

Dependence upon reaction of the effective preservatives; limiting concentration (ppm) of the preservatives at which no development of yeast occurs for pH:

| pH | 3.75 | 4.0 | 4.5 | 5.0 | 6.0 |
|---|---|---|---|---|---|
| Na-benzoate | 150 | 300 | 500 | 850 | 1500 |
| Ca-formate | 1200 | 2000 | >2000 | >2000 | >2000 |
| Na-disulphite | <250 | <250 | 250 | 300 | 1000 |

Whereas benzoic acid and Ca-formate can only be used in economically reasonable concentrations in highly acid silages (for example especially for maize), Na-disulphite is also active in a less acid medium with a pH of around 5.0 which prevails in withered silages.

According to the invention, therefore, the components defined above are used in the quantities defined above. The quantity of benzoic acid or benzoic acid salt added amounts to at least about 300 ppm and to at most about 600 ppm. The lower limit to the quantity of formate added is preferably 1000 ppm and the upper limit preferably 2500 ppm. The salts of sulphurous acid are preferably added in a quantity of at least 100 ppm and at most 250 ppm. Sodium benzoate is preferably used as the salt of benzoic acid both for economic reasons and because it is readily soluble in water and, for this reason, is readily and completely dissolved when the process according to the invention is carried out in practice. According to the invention, it is preferred for economic reasons to use calcium formate as the formate because it is a readily obtainable commercial product. Sodium disulphite is preferred for the same reasons.

The quantities and ratios quoted are quantities and ratios by weight unless otherwise indicated. The quantities quoted apply to sodium benzoate, calcium formate and sodium disulphite. In cases where other compounds are used, they have to be employed in corresponding equivalent quantities. A concentration range in the sense of the disclosure in Table 2 is selected according to the reaction prevailing on completion of the anaerobic fermentation phase (for example maize pH 3.7 to 3.8; fermented hay pH 4.5 to 5.5). The combination of the preservatives mentioned results in a considerable reduction in the concentration in which the individual components would have to be used.

The method according to the invention may be applied with advantage to silages of which the pH-value is below 5.5, preferably below 5 and, with particular preference below 4.5. In cases such as these, relatively small quantities of the additives according to the invention are active to an extraordinarily high degree. Particularly advantageous results are obtained in cases where the method according to the invention is applied to maize silage. In either case, it is preferred to introduce the additives according to the invention during storage of the green fodder. As already mentioned above, however, they may also be added to the silage after it has been taken out of storage in order to prevent the decomposition processes.

In order to improve the flow properties and storage properties of the additives according to the invention, especially in cases where they are added in the form of a mixture, it can be advisable to add to them carriers which have no harmful effect upon the silage or which improves its fodder value. Carrier substances of the kind in question can also facilitate handling of the agent used in accordance with the invention. With the increased quantity of substances added, it is possible to obtain a more uniform distribution in the silage, particularly green material, especially since the flow properties of the agent are also improved. Examples of carriers are ground rock phosphate, bonemeal, tricalcium phosphate, bolus, talcum, stearates of the alkaline earth metals, common salt, rock salt or other fodder-grade minerals.

A conventional silaging agent may be added to the fodder independently of the substances added in accordance with the invention. Conventional silaging agents are, for example, mixtures of nitrites and hexamethylene tetramine (DT-OS No. 2,158,946), mixtures of nitrites, hexamethylene tetramine and benzoic acid (DT-OS No. 2,335,253) and mixtues of formates and hexamethylene tetramine (German Patent Application P No. 26 02 626.6 = DT-OS No. 2,602,626). These silaging aids control the fermentation process. In some cases, these silaging aids contain the same active ingredients which are added in accordance with the invention. In this case, the maximum quantities used in accordance with the invention should be based on the active ingredients added in accordance with the invention, i.e. without taking into consideration the quantities of identical active ingredients which are added in the form of silaging agents. However, the total quantity of active ingredients, for example benzoate and formate, should preferably not exceed the maximum quantities specified above of 1000 ppm of benzoate and 3000 ppm of formate. At all events, the quantity of salts of sulphurous acid should not exceed 750 ppm.

The preserving additives benzoic acid, Ca-formate and Na-disulphite have already been tested in a relatively large number of silaging tests for their suitability as silaging aids for controlling the fermentation process in the preparation of fermented fodder. In order to prevent butyric acid fermentation during the fermentation process, they are used in concentrations approximately 10 times higher than required for preventing the secondary fermentation processes. According to investigations (for example Luedke et al. 1959: Am J. vet. Res. 20, 690 – 696), Weissbach and Laube (1967: Arch. Tierernahrung 17, 345 – 359), Na-benzoate in a high concentration is only suitable to a limited extent for controlling the fermentation process, whereas neither Ca-formate nor Na-disulphite is suitable. By contrast, there have not yet been any investigations to determine whether the above-mentioned preservatives, either individually or in combination, have a selective effect upon the aerobic decomposition processes in fermented fodder.

There are no objections in regard to an undesirable effect, in terms of nutrition physiology, of the preservatives used either individually or in combination in the fodder treated in accordance with the invention, as shown by the results of numerous feed tests conducted with these preservatives, in some cases in a concentration up to 20 times higher (for example Luedke et al. 1959: Am J. vet. Res. 20, 690 - 696).

Our own tests have shown that the mixtures of preservatives produced in accordance with the invention can be added with the required effect of preventing aerobic decomposition processes both during storage of the fodder and after removal of the silage from storage. This is demonstrated by the figures quoted in Tables 1 and 3 for the aerobic stability (the uptake of oxygen or the release of $CO_2$ during the aerobic storage of silage is an effective measure of the decomposition processes occurring). The chemical properties for the quality of the silages and also the losses occurring during the anaerobic fermentation phase were not adversely affected in any case, instead there is an improvement in the quality of the fermented fodder and a reduction in losses. This is a welcome secondary phenomenon of this process specially designed for controlling and suppressing aerobic processes in the fermented fodder.

TABLE 3

Addition or preservatives to green maize (DM = 23.4) during storage: fermentation time 4.5 months

| No. | Additives | Concentration ppm | % | Fermentation losses (6/500 g) | Aerobic stability $mg/CO_2/20$ g 2 days | 6 days |
|---|---|---|---|---|---|---|
| 1 | Untreated | | | 3.2 | 145 | >300 |
| 2 | Na-benzoate | 500 | | 2.8 | 13 | 82.5 |
| 3 | Na-benzoate | 250 | | 3.0 | 29 | >300 |
| 4 | Ca-formate | 2000 | | 3.1 | 32 | >300 |
| 5 | Na-disulphite | 250 | | 2.6 | 8 | 22.5 |
| 6 | Ca-formate + Na-benzoate | 2000 250 | 89 11 | 2.8 | 7 | 11 |
| 7 | Ca-formate + Na-disulphite | 2000 250 | 89 11 | 2.6 | 5 | 8 |
| 8 | Ca-formate + Na-benzoate + Na-disulphite | 2000 250 250 | 80 10 10 | 2.4 | 3 | 5 |

DM = dry matter

EXAMPLE 1

0.25% = 100 kg of a mixture of which 75% consists of Ca formate, 20% of Na disulphite and 5% of Na benzoate, are continuously added by means of a standard metering device on the conveyor fan during the silaging of 100 cubic meters, corresponding to 40 t, of heavily withered meadow grass (30 to 50% DM).

EXAMPLE 2

0.25% = 300 kg of a mixture consisting of 80% of Na formate, 10% of Na disulphite and 10% of benzoic acid, are continuously added during harvesting by means of a standard metering device on the chaff cutter during the silaging of 200 cubic meters, corresponding to 120 t, of maize.

EXAMPLE 3

0.35% = 210 kg of a mixture of which 50% consists of a conventional silaging aid for improving fermentation (containing 25% of Na nitrite, 14% of hexamethylene tetramine, 18% of Ca phosphate and 43% of fillers), 40% of Ca formate, 5% of Na benzoate and 5% of Na disulphite (for preventing aerobic decomposition), are continuously added by means of a metering device or by hand on a conveyor belt during the silaging of 100 cubic meters, corresponding to 60 t, of lightly withered meadow grass (25% DM).

EXAMPLE 4

A mixture consisting of 80% of Ca formate, 10% of Na disulphite and 10% of Na benzoate is scattered onto the surface of a maize silage tending towards heating in a high-rise silo or onto the surface of a tap wall in a low silo, and mixed with the fodder in such a quantity that the surface of the fodder contains 0.25% of the mixture to a depth of 10 cm of the loose silage.

We claim:

1. A method of preventing aerobic decomposition processes in fermented fodder, wherein benzoic acid and its salts, sodium or calcium formate and alkali salts of sulphurous acid are added either individually or in admixture to the fodder during storage or to the silage after removal from storage, in such quantity that the fermented fodder contains in synergistic combination from 300 to 600 ppm of benzoic acid, from 1000 to 2500 ppm of sodium or calcium formate and from 100 to 250 ppm of salts of sulphurous acid.

2. A method as in claim 1, wherein the fodder contains conventional silaging aids for controlling the fermentation process.

3. A method as in claim 1, wherein the fodder is maize.

4. The method of claim 1 wherein the fodder is a carbohydrate-containing silage.

5. An agent for preventing aerobic decomposition processes in fermented fodder prepared from green fodder, which when added to fodder provides a fermented fodder which contains from 300 to 600 ppm of benzoic acid or its water soluble salts, from 1000 to 2500 ppm of calcium or sodium formate and from 100 to 250 ppm of alkali salts of sulphurous acid based on the weight of the green fodder.

* * * * *